Patented May 16, 1933

1,909,757

UNITED STATES PATENT OFFICE

THOMAS COXON, OF BILLINGHAM ON TEES, ENGLAND, ASSIGNOR TO ATMOSPHERIC NITROGEN CORPORATION, OF SOLVAY, NEW YORK, A CORPORATION OF NEW YORK

PROCESS FOR PRODUCING COMMERCIAL AMMONIUM CARBONATE

No Drawing. Application filed July 23, 1926, Serial No. 124,552, and in Great Britain July 23, 1925.

This invention relates to a method of producing solid carbonate of ammonia compositions, and more particularly to a process for the production of products known as commercial ammonium carbonate.

Various carbonate of ammonia compositions, i. e., compounds of ammonia, carbon dioxide and water or mixtures of these compounds, are known and have been described. One of the best known is "commercial ammonium carbonate", which is usually represented as a mixture or combination, in equal molecular proportions, of ammonium bicarbonate and ammonium carbamate,

This commercial product can be made by passing carbon dioxide gas into an aqueous ammoniacal liquor when the solid "carbonate" is precipitated from the solution. This salt or product is, however, unstable below a temperature of 33° C. in the presence of water and, consequently, in its preparation by this method, the reaction, and filtration or separation from the mother liquor, and drying, must all be carried out above this temperature of 33° C.

I have found that solid (i. e., non-natant) ammonium carbamate in the presence of water, either as liquid or vapor, will react readily and smoothly with a carbon dioxide gas with formation of the desired commercial ammonium carbonate as a solid dry product, and that although this method requires the preparation of ammonium carbamate as an intermediate product and is in that sense an indirect method, yet by virtue of the ease of preparation, both of the carbamate and of the "carbonate" therefrom, it has distinct advantages. This reaction might be represented by the equation—

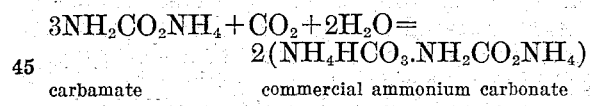
carbamate      commercial ammonium carbonate

As indicated by the equation, the water takes part in the reaction and is thereby removed so that a solid substantially dry product may be obtained.

I have found, further, that not only can the commercial carbonate containing about 32% ammonia by weight be made by this method, but that other compounds or compositions, the ammonia content of which varies from about that of the carbamate (43.6%) to about that of ammonium bicarbonate (21.5%), or say from 22 to 40 per cent by weight, can be made by the same procedure, by simply varying the relative amounts of water and carbon dioxide with which the carbamate is treated, and the duration of the treatment. By regulating the amount of water, when present as liquid, so that it corresponds to that required for the formation of the predetermined composition, a dry solid product may be obtained.

In connection with and as a part of this process, I have also developed a method for the production of the required intermediate ammonium carbamate material. I have found that ammonium carbamate is produced readily, and in a condition satisfactory for its subsequent treatment, by introducing ammonia ($NH_3$) and carbon dioxide ($CO_2$), in the proportion of about two moles of ammonia to about one mole of carbon dioxide, into an aqueous solution saturated with carbamate. The ammonia and carbon dioxide react in the medium of the solution to form carbamate, which is precipitated as solid.

The practice of my invention is obviously not limited to the use of a carbamate prepared as herein above described, but the carbamate may be prepared in any suitable manner and in either a "wet" or "dry" way; nor is it necessary that the carbamate material should be free from other carbonate materials, provided the material as a whole has a predominant carbamate constitution but other salts, such as the normal carbonate or bicarbonate or their double salts, may also be present. In some cases, particularly when the moisture content of the carbamate material is relatively high, it may be advantageous to introduce some ammonia during the treatment of the material with $CO_2$. This ammonia will assist in the removal of water by formation of solid ammonium bicarbonate.

The following example illustrates one method of carrying the invention into practice:

Production of ammonium carbamate

Gases containing ammonia ($NH_3$) and carbon dioxide ($CO_2$) are passed into a volume of water until the concentrations of $NH_3$ and $CO_2$ are each about 30 per cent by weight of the total solution. The temperature may be from 20° to 50° C. This solution approximates a saturated condition with respect to ammonium carbamate. $NH_3$ and $CO_2$ gases, in the proportion of about two moles of ammonia to one of carbon dioxide, are then introduced into the solution. Ammonium carbamate is precipitated and the introduction of the $NH_3$ and $CO_2$ gases is continued at a rate corresponding substantially to that of precipitation of an equivalent amount of the carbamate. About 50° C. is the preferred temperature, but if the operation is carried out at a pressure higher than that of the ordinary atmosphere, the preferred and limiting temperatures are higher.

The solid carbamate is separated from the solution either by filtration, decantation, centrifuging, or by any other suitable means, but in any case, it is preferred not to remove the mother liquor adhering to the solid particles.

Production of commercial ammonium carbonate

The moist ammonium carbamate obtained as above described, and containing, for example, 10 per cent water, is treated with a carbon dioxide gas such as lime kiln gas, at about ordinary temperature or at any other convenient temperature at which the reaction product does not decompose. Additional water, if required, is added to the solid material as liquid, or is introduced as vapor, for example, in the form of steam, until this additional water, together with the original moisture content, is adequate for the formation of the desired carbonate product. A substantially dry commercial ammonium carbonate product is formed.

The lime kiln or other carbon dioxide gas may be used under pressure, thereby increasing the concentration of effective carbon dioxide and hence the rate of reaction.

By suitable regulation of the amount of water present, either as liquid or vapor, and of the degree of treatment with carbon dioxide, a product can be obtained with an ammonia content greater or less than that of the commercial carbonate, and which is at the same time substantially dry. The products in which the $CO_2$ content is relatively large as compared with the $NH_3$ content, are as a rule more stable and suitable for transit, since they have less tendency to lose ammonia.

The phrase "ammonia-carbon dioxide ratio" of the claims, of course does not mean that the ammonia and carbon dioxide are present as free ammonia, $NH_3$, and free carbon dioxide, $CO_2$, in the solid materials of my process, but is used in the usual chemical sense of indicating the composition of the product in terms of its ammonia and carbon dioxide equivalents, i. e., the amounts of ammonia, $NH_3$, and carbon dioxide, $CO_2$, which may be considered as entering into the formation of the solid materials.

I claim:

1. The process of producing solid carbonate of ammonia compositions from ammonia and carbon dioxide gases and water which consists in establishing a reaction between said gases in the presence of water and limiting said reaction to the formation of carbamate in solid form, separating said carbamate from the solution to obtain a non-natant mass of solid carbamate material and then treating said separated solid carbamate material in its non-natant state in the presence of moisture with $CO_2$ to form a solid product containing ammonium bicarbonate.

2. The process of producing solid carbonate of ammonia compositions from ammonia and carbon dioxide gases and water which consists in establishing a reaction between said gases in the presence of water and limiting said reaction to the formation of carbamate in solid form, separating said carbamate from the solution to obtain a non-natant mass of carbamate material and then treating said separated solid carbamate material in its non-natant state in the presence of moisture with $CO_2$ and ammonia to form a solid product containing ammonium bicarbonate.

3. The process of producing solid carbonate of ammonia compositions, in which the ammonia-carbon dioxide ratio is less than that of ammonium carbamate, which comprises introducing carbon dioxide and ammonia, in the proportion approximating one mole of $CO_2$ to two moles of $NH_3$, into an aqueous solution saturated with respect to ammonium carbamate, whereby solid ammonium carbamate is formed, separating said solid from the solution to obtain a non-natant mass of solid carbamate in a moist condition due to accompanying mother liquor, and then bringing $CO_2$ into reaction contact with said moist solid carbamate.

4. The process of producing solid carbonate of ammonia compositions, which comprises establishing a supply of solid non-natant material having a predominant ammonium carbamate constitution bringing $CO_2$ into reaction contact with said non-natant ammonium carbamate material in the presence of water and introducing limited volumes of ammonia with the $CO_2$, sufficient to cause surplus water to be removed by formation of solid carbonate of ammonia material and discontinuing the reaction between the $CO_2$ and the carbamate when the product reaches the condition of commercial carbonate of ammonia wherein ammonium carbamate is present in the approximate proportion of one molecule of the carbamate to one molecule of the carbonate.

5. The process of producing solid carbonate of ammonia compositions, in which the ammonia-carbon dioxide ratio is less than that of ammonium carbamate, and in a substantially dry condition, which comprises establishing a supply of solid non-natant material having a predominant ammonium carbamate constitution bringing $CO_2$ into reaction contact with said non-natant ammonium carbamate material in the presence of water, whereby water is removed by formation of said carbonate of ammonia composition, and introducing limited volumes of ammonia with the $CO_2$, sufficient to cause the water not so removed to be substantially removed by formation of solid carbonate of ammonia material and discontinuing the reaction between the $CO_2$ and the carbamate upon the formation of a carbonate of ammonia composition having an ammonia-carbon dioxide ratio approximating that of equal molecular quantities of bicarbonate and carbamate of ammonia.

6. The process of producing solid carbonate of ammonia compositions which comprises bringing $CO_2$ into reaction contact with material constituted practically wholly of carbamate in non-natant, solid, form and in the presence of moisture so limited in amount that at the end of the resultant reaction the product will be a dry, solid, commercial ammonium carbonate.

7. The process as set forth in claim 6 in which the moisture is restricted to approximately 10% by weight of the solid composition under treatment.

8. The process as set forth in claim 6 in which the carbon dioxide treatment is continued until and concluded when the solid product of commercial carbonate of ammonia contains approximately one molecule of ammonium carbamate to approximately one molecule of carbonate of ammonia.

In testimony whereof, I have hereunto set my hand.

THOMAS COXON.